US007004623B2

(12) United States Patent
Nakagawa et al.

(10) Patent No.: US 7,004,623 B2
(45) Date of Patent: Feb. 28, 2006

(54) DISPOSABLE SHEATH FOR DATA LOGGER PROBE AND METHOD FOR MEASURING AND RECORDING TEMPERATURE IN A CLOSED CONTAINER

(76) Inventors: Jon Nakagawa, 1970 Broadway, Suite 625, Oakland, CA (US) 94612; Gregory T. Reel, 1021 Mazzone, San Jose, CA (US) 95120

( * ) Notice: Subject to any disclaimer, the term of this patent is extended or adjusted under 35 U.S.C. 154(b) by 0 days.

(21) Appl. No.: 10/375,187

(22) Filed: Feb. 26, 2003

(65) Prior Publication Data

US 2003/0179809 A1 Sep. 25, 2003

Related U.S. Application Data (60) Provisional application No. 60/366,300, filed on Mar. 21, 2002.

(51) Int. Cl.
*G01K 1/08* (2006.01)
(52) U.S. Cl. ............... 374/158; 374/208; 374/170; 374/136; 136/200
(58) Field of Classification Search ............ 374/158, 374/208, 183, 163, 136, 139, 141, 170, 179; 136/200
See application file for complete search history.

(56) References Cited

U.S. PATENT DOCUMENTS

| 2,100,613 | A | | 11/1937 | Rowntree | |
|---|---|---|---|---|---|
| 2,838,935 | A | * | 6/1958 | Di Cecio et al. | 338/28 |
| 2,962,898 | A | * | 12/1960 | Burling et al. | 374/182 |
| 3,309,237 | A | * | 3/1967 | Kelchner et al. | 136/221 |
| 3,738,173 | A | | 6/1973 | Sato | |
| 3,785,208 | A | * | 1/1974 | Marsilia et al. | 374/202 |
| 3,987,899 | A | | 10/1976 | Vyprachticky | |
| 3,999,434 | A | * | 12/1976 | Yen | 374/158 |
| 4,083,250 | A | * | 4/1978 | Goff et al. | 374/155 |
| 4,113,090 | A | | 9/1978 | Carstens | |
| 4,349,031 | A | * | 9/1982 | Perlin | 600/380 |
| 4,412,090 | A | * | 10/1983 | Kawate et al. | 136/230 |
| 4,457,633 | A | | 7/1984 | Andrews | |
| 4,467,134 | A | * | 8/1984 | Pustell | 136/231 |
| 4,499,330 | A | * | 2/1985 | Pustell | 136/230 |
| 4,830,515 | A | * | 5/1989 | Cortes | 374/208 |
| 4,984,904 | A | * | 1/1991 | Nakano et al. | 374/139 |
| 5,005,986 | A | * | 4/1991 | Najjar et al. | 374/179 |
| 5,022,766 | A | | 6/1991 | Phipps | |
| 5,069,553 | A | * | 12/1991 | Phillippi | 374/140 |
| 5,181,779 | A | * | 1/1993 | Shia et al. | 374/139 |
| 5,366,290 | A | * | 11/1994 | Mayer et al. | 374/130 |
| 5,498,079 | A | * | 3/1996 | Price | 374/208 |
| 5,709,476 | A | * | 1/1998 | Wu et al. | 374/208 |
| 5,782,561 | A | * | 7/1998 | Pai | 374/151 |
| 6,045,261 | A | * | 4/2000 | Rossum et al. | 374/208 |

(Continued)

*Primary Examiner*—Gail Verbitsky
(74) *Attorney, Agent, or Firm*—Brian Beverly; Beeson Skinner Beverly LLP (57) ABSTRACT

A disposable sheath for a data logger probe comprises a mounting plate 12 and an elongated sheath 14 attached perpendicularly to the mounting plate for insertion through the wall or top cover and into the interior of a container, the mounting plate having inwardly projecting overlap members 22 and stop bosses 20 for mounting a data logger on the mounting plate, and the sheath having a longitudinal bore 60 in communication with an aperture 48 in the mounting plate for insertion therein of a data logger probe for measuring the environmental conditions on the interior of the container while keeping the data logger on the outside of the container for viewing of displayed information related to those conditions.

27 Claims, 10 Drawing Sheets

U.S. PATENT DOCUMENTS

| | | | |
|---|---|---|---|
| 6,104,011 A * | 8/2000 | Juliano | 219/544 |
| 6,126,594 A | 10/2000 | Bayer | |
| 6,285,955 B1 * | 9/2001 | Goldwasser | 702/6 |
| 6,367,974 B1 * | 4/2002 | Lin | 374/179 |
| 6,485,175 B1 * | 11/2002 | Nimberger et al. | 374/142 |
| 6,536,950 B1 * | 3/2003 | Green et al. | 374/179 |
| 6,755,829 B1 * | 6/2004 | Bono et al. | 606/61 |
| 6,789,691 B1 * | 9/2004 | Martin et al. | 220/296 |
| 6,820,741 B1 * | 11/2004 | Ferguson et al. | 206/310 |
| 6,827,486 B1 * | 12/2004 | Welker | 374/147 |
| 2001/0029780 A1 * | 10/2001 | Bartel | 73/152.03 |
| 2002/0172259 A1 * | 11/2002 | Bach | 374/208 |
| 2004/0264544 A1 * | 12/2004 | Fischer et al. | 374/208 |
| 2005/0157773 A1 * | 7/2005 | Van Der Maat et al. | 374/139 |

* cited by examiner

DISPOSABLE SHEATH FOR DATA LOGGER PROBE AND METHOD FOR MEASURING AND RECORDING TEMPERATURE IN A CLOSED CONTAINER

This application claims the benefit of U.S. Provisional Application 60/366,300, filed Mar. 21, 2002.

BACKGROUND

This invention relates to a disposable sheath for a data logger probe. In particular, it relates to a disposable sheath for a data logger probe enabling measurement of the environment conditions in the interior of a container while retaining the data logger outside the container for ease of reference.

Data loggers are used in shipping and storage containers to measure and record environmental conditions such as temperature, humidity, pressure, and vibration. Data loggers are especially valuable in the container freight industry when used in association with the shipment of perishables and sensitive electronics, in refrigerated packaging, and in containers for extended storage. Certain problems arise from placing the data logger inside the shipping container with sensitive goods where it is undesirable to open the container to read the logger. Opening the container to obtain the data logger readings is inconvenient, time consuming, and particularly with respect to refrigerated containers, may stress sensitive contents. Further, data loggers employ sophisticated electronics which are susceptible to damage from moisture. A data logger may be protected by encasing the electronics of the device in a water-proof case or by placing the data logger in a water-proof bag, but such water-proofing efforts complicate the process of obtaining reliable environmental measurements, increase the cost of manufacture, and are inconvenient. Finally, placing the data logger inside the container takes up valuable storage space normally used for the container's contents or for the refrigerant or insulation used for preserving the contents.

One solution to the above problem has been to place the data logger outside the container and extend a probe from the data logger into the container or package. This has the multiple advantages of being able to measure the conditions inside the container while keeping the container closed, keeping the data logger away from a moist environment where it is subject to damage and reduced performance, and allowing the data logger to be read immediately without opening the container. The generally accepted method for introducing the probe into the container is to insert it through the top or a wall of the container. This approach may damage the probe or the data logger and compromise temperatures inside the container. Accordingly, there is a need for an improved method or device for inserting a data logger probe into the interior of a container that allows accurate measurement and recording of the conditions in the container while keeping the data logger outside the container.

SUMMARY OF THE INVENTION

A disposable sheath for a data logger probe according to the invention comprises a mounting plate for mounting the device against the exterior surface of a container and an inwardly-extending elongated sheath attached to the mounting plate for insertion through a container wall or top cover into the interior of the container. The mounting plate has outwardly extending mounting jaws for mounting a data logger thereon such that the latter remains on the outside of the container, facing outward. Preferably the mounting plate is mounted in a recess in the exterior surface of the container sufficiently deeply that the outer face of the data logger is flush with the exterior surface of the container.

On the inner surface of the mounting plate is attached an inwardly extending linear projection. A central canal of the linear projection is in communication with the aperture in the mounting plate. The sheath has a longitudinal bore having an enlarged inner diameter at its proximal end sized to accept the linear projection. The remaining portion of the sheath's bore has an inner diameter approximately the same as the diameter of the central canal of the linear projection and extends substantially the entire length of the sheath to a distal end thereof. The sheath is attached to the mounting plate by sliding the enlarged portion of the sheath's longitudinal bore over the linear projection. The enlarged portion of the bore has a longitudinal extent of approximately the same dimension as the length of the linear projection. Accordingly, when the sheath is mounted to the mounting plate the aperture in the mounting plate is in communication with the canal in the linear projection which, in turn, is in communication with the bore of the sheath.

Frequently the walls of a refrigerated container are insulated, resulting in walls having a thickness of up to two inches or more. The sheath, therefore, is of sufficient length to pass through the walls of a container, including those of such insulated containers, to extend into the interior of the container. Generally, to use the disposable sheath, a hole is prepared through the side of the container, including any layers of insulation, just large enough to accommodate the sheath. The sheath is then inserted into the hole until the mounting plate meets the outer surface of the container. Preferably the distal end is tapered to facilitate insertion. Affixing the mounting plate to the outer surface of the container fixes the sheath in place, such that it extends through the wall of the container and any associated layer of insulation into the interior space of the container. The sheath should extend into the container a sufficient distance to expose enough of the surface of the sheath to the interior of the container so that the temperature in the container and that in the bore of the sheath can equilibrate reasonably quickly. The mounting plate, once mounted on the surface of the container, seals the hole in the container to preserve the integrity of the interior.

The probe of a data logger is generally in the form of a flexible wire having thermic properties for measuring temperature. To attach the he data logger to the container, the data logger probe is first extended from the data logger through the mounting plate aperture and into the bore of the sheath to its distal end. The data logger is then attached to the mounting plate from where it can be read from outside the container.

The advantages of the invention are that the data logger's electronics are not exposed to any moisture in the container, the container need not be opened to retrieve the data logger if it is desired to read the data logger, the interior of the container remains undisturbed even while its temperature is being measured and recorded, and the sheath does not noticeably compromise the storage space in the container for refrigerant or contents.

BRIEF DESCRIPTION OF THE ILLUSTRATIONS

DETAILED DESCRIPTION OF THE ILLUSTRATED EMBODIMENTS

Figure 1:
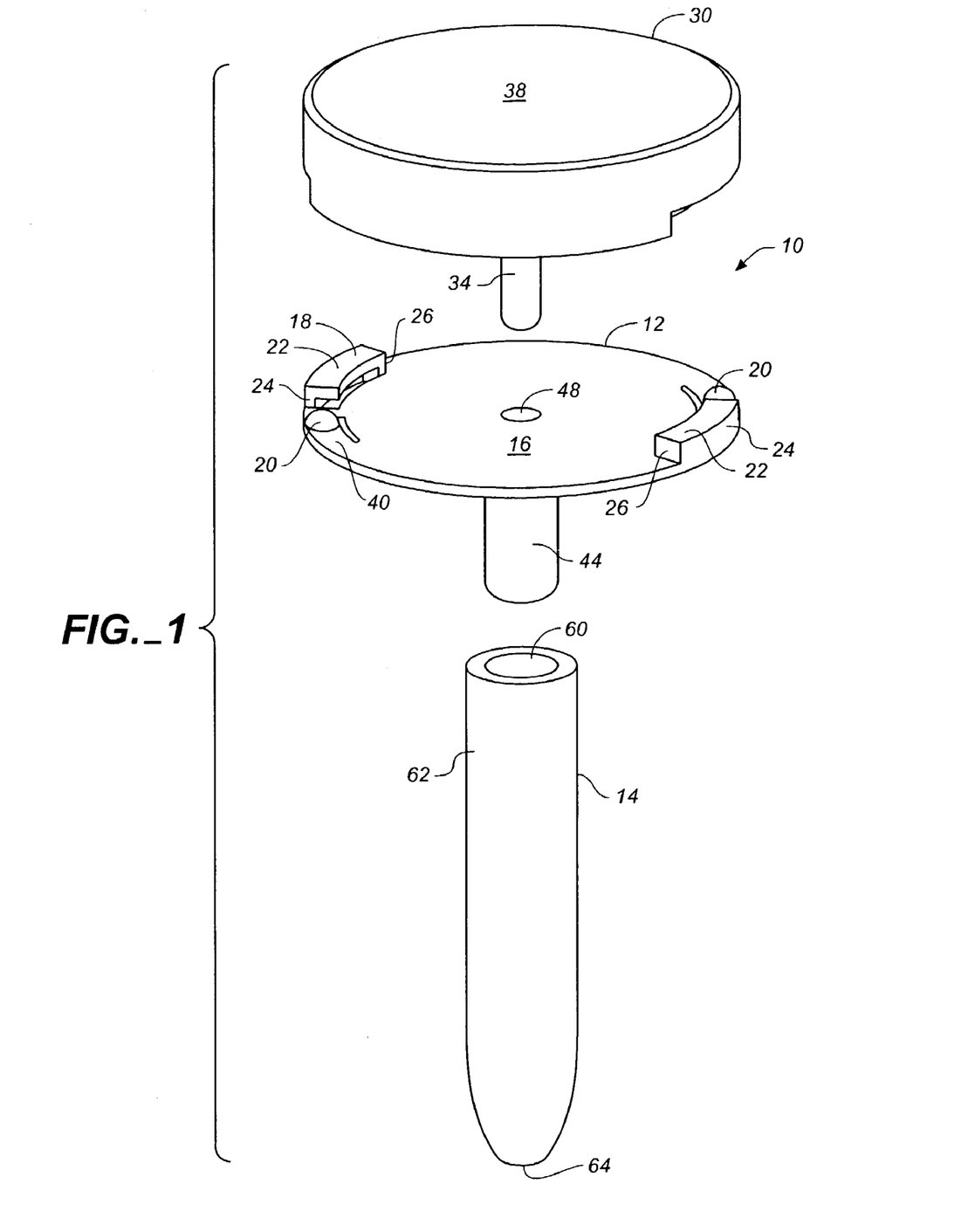
FIG. 1 is an exploded top perspective view of a disposable data logger sheath according to the invention.

A disposable sheath for a data logger probe and method for measuring and recording temperature in the interior of a closed container while retaining the data logger outside the container is illustrated and described below. Referring initially to FIG. 1, a disposable sheath 10 for a data logger probe according to the invention comprises a mounting plate 12 and elongated sheath 14. On its outer face 16, the mounting plate 12 has inwardly projecting mounting jaws 18 and adjacent stop bosses 20. Each mounting jaw 18 comprises an overlap member 22 projecting inwardly from the top of a support wall 24. The overlap members are spaced outwardly from and substantially parallel to the outer surface 16 of the mounting plate 12. In the preferred embodiment shown in FIGS. 1 and 2, two mounting jaws 18 are provided. However, a greater plurality of mounting jaws could certainly be employed within the limits of the periphery of mounting plate 12. Each mounting jaw 18 has further associated with it at least one stop wall 26 across from one of the stop bosses 20. The stop walls shown in the illustrated embodiment are integrally joined with support wall 24 and overlap member 22, but in alternate embodiments could be free standing.

Figure 2:
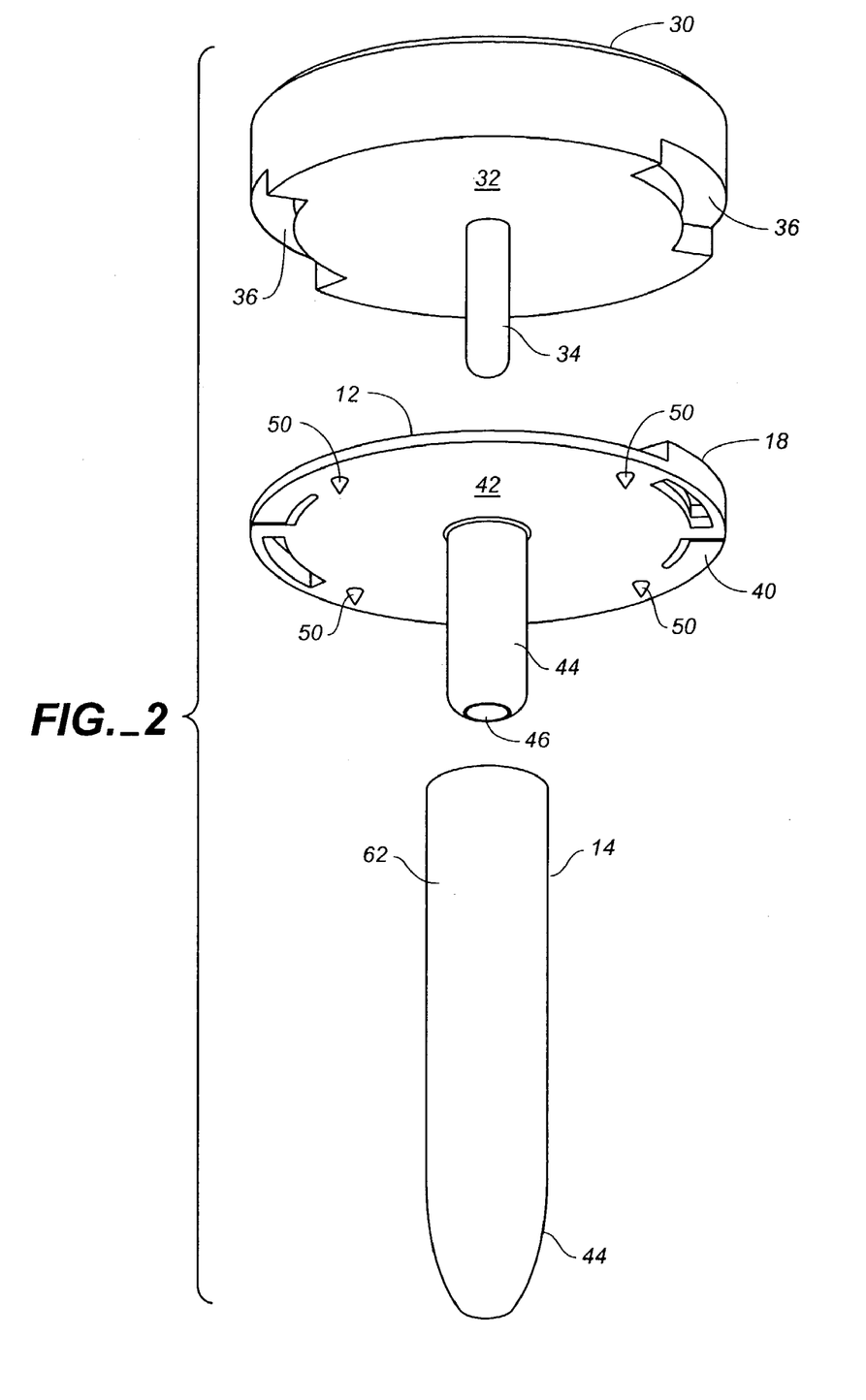
FIG. 2 is an exploded bottom perspective view of the disposable data logger sheath shown in FIG. 1.

As shown in FIGS. 1 and 2, a cover plate 30 is provided having, on an inside face 32 thereof, an inwardly extending peg 34. Two arced recesses 36 are provided on opposite sides of the cover plate 30 that mate with mounting jaws 18 when cover plate 30 is pressed down over mounting plate 12. Preferably, cover plate 30 has a thickness no greater than that of a data logger of the type intended for mounting onto mounting plate 12 so that, when cover plate 30 is pressed against plate 12, its upper surface 38 is substantially parallel with or recessed below the exterior surface of the container.

With reference again to FIG. 1, each stop boss 20 is disposed on the upper surface of a resilient finger 40 which otherwise comprises a portion of mounting plate 12. Accordingly, each stop boss 20 protrudes upwardly from the outer surface 16 of mounting plate 12. By flexing finger 40, each stop boss is movable from a rest position to a biased position in which the apex thereof is in planar alignment with the outer face 16 of mounting plate 12.

Referring to FIG. 2, attached to the inner face 42 of the mounting plate 12 is an inwardly-extending linear projection 44. A central canal 46 extends axially through, such that it is open on the bottom end of projection 44 and in direct linear communication with aperture 48 in the mounting plate (see FIG. 1). In the preferred embodiment, peg 34 has a diameter slightly larger than the diameter of aperture 48 and central canal 46, such that when peg 34 is inserted into the aperture and canal, it "press fits" in place and is frictionally retained. Also provided on the inner face 42 of the mounting plate are a plurality of retention pins 50 for holding the mounting plate 12 in position against rotational forces exerted when a data logger is rotatably mounted onto the mounting plate as discussed in more detail below.

Figure 3:
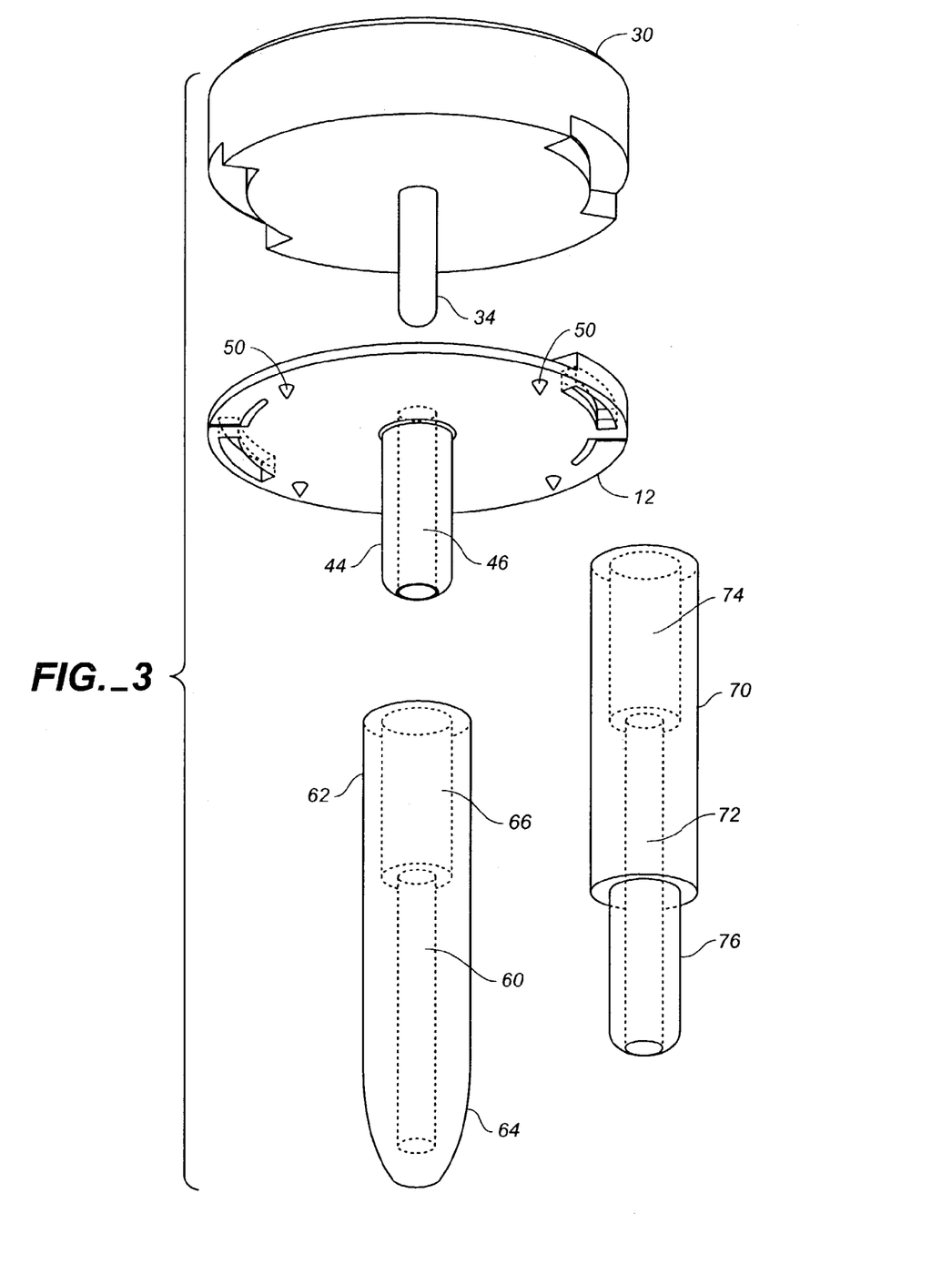
FIG. 3 is an exploded bottom perspective view of the disposable data logger sheath shown in FIG. 1 showing additional interior detail in shaded lines and a sheath extender.

As shown in FIGS. 1 and 3, sheath 14 has a longitudinal bore 60 extending axially from its proximal end 62 to a distal end 64 thereof. The longitudinal bore 60 has, at its proximal end 62, an enlarged portion 66 having a cross-sectional caliber of sufficient size to accept therein linear projection 44. The enlarged portion 66 of the bore 60 has a longitudinal dimension approximately the same as the length of the linear projection 24. The remaining portion of the sheath's bore 60 has a diameter approximately the same as the diameter of the central canal 46 of the linear projection 44. Therefore, sheath 14 can be affixed to the mounting plate 12 by sliding the enlarged portion 66 of the sheath's longitudinal bore 60 over the linear projection 44. In this configuration, the aperture 48 in the mounting plate 12 and central canal 46 in the linear projection 44 are arranged in direct linear communication with the bore 60 of the sheath 14. Preferably, the distal end 64 of the sheath 14 is closed to seal the bore 60 against any moisture which may be in the interior of a container and to avoid contamination while being inserted through the container wall.

Commonly, the walls of a refrigerated container are insulated in varying degrees, giving them varying thicknesses. Accordingly, the sheath 14 must be of a sufficient length to pass from the inner face 20 of the mounting plate 12 (disposed on the outside of the container) through the selected wall of the container and into the interior of the container. Accordingly, the invention provides sheaths of varying lengths to accommodate the varying thicknesses of container walls. An alternative embodiment of the invention includes sheath extenders 70 of like cross-sectional dimension as sheath 14 which are attached between mounting plate 12 and sheath 14 for effectively extending the length of sheath 14 as appropriate for the thickness of a given container wall. Each extender 70 includes an extender bore 72 of like diameter as longitudinal bore 60. Extender bore 72 includes an enlarged extender bore portion 74 of like diameter as the enlarged portion 66 of bore 60. The far end 76 of the extender 70 has a peripheral diameter approximately equivalent to the enlarged portion 66 of sheath 12 such that the far end 76 of the extender 70 can be inserted into the enlarged portion 66 of the sheath. Subsequent disposition of the enlarged extender bore portion 74 over linear projection 44 effectively extends the length of the sheath.

Figure 2A:
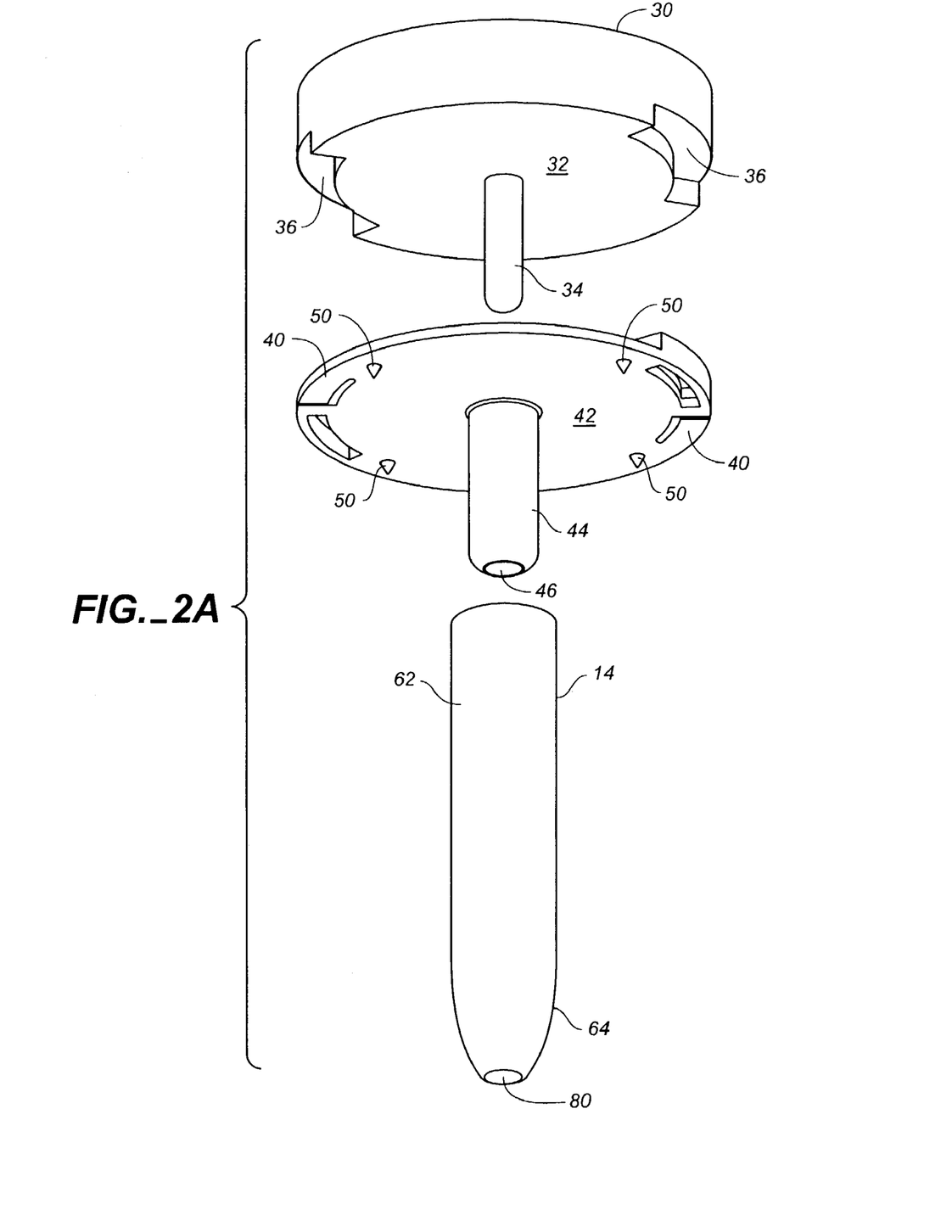
FIG. 2A is an exploded bottom perspective view of a second embodiment of a disposable data logger according to the invention illustrating the distal end of the sheath open.

In an alternative embodiment of the invention depicted in FIG. 2A, wherein moisture is less of an issue, longitudinal bore 60 may be fully extended through the sheath 12 to form an opening 80 at the sheath's distal end 64. An open bore allows for quicker heat exchange between the interior of the container and the data logger probe disposed in the sheath. Still, the interior of th container remains sealed from the outside environment, because a data logger, or cover plate 30, as the case may be, when installed on mounting plate 12 blocks aperture 28 and, hence, bore 60.

In field use, mounting plate 12 is generally affixed to the outer surface of a container, usually in a recess prepared in a wall or possibly a top cover of the container. The mounting plate is held in place by adhesive, tape, threaded fasteners, or any means of adhering the mounting plate to the container which leaves the mounting jaws 18 facing outward and exposed to view. In the preferred mode of use, a recess having the same diameter as the mounting plate 12 is created in the surface of the container at a depth sufficient that, when a disposable sheath with a data logger attached to the mounting plate 12 is affixed to the container wall, the top surface of the data logger is flush with the adjacent top surface of the container. This mounting configuration protects the data logger and mounting plate from being crushed or scraped, and allows containers having data loggers mounted on them to be stored immediately against each other.

In addition to preparing to the recess, a hole must be made in the container, e.g., by drilling through or puncturing the wall of the container, including any insulation, of a diameter just large enough to accommodate the sheath 14. A sheath is selected having a length, including an extender if needed, sufficient to reach into the interior of the container when the mounting place is affixed in the recess. In the normal mounting process, the sheath 14 is inserted into the hole until the inner face 42 of the mounting plate 12 meets the outer surface of the recess in the container. In the preferred embodiment, the distal end 64 of the sheath 14 is tapered in a frustro-conical shape to facilitate passing the sheath through the hole. Once the mounting plate 12 is attached to the container, the sheath is fixed in place and moving plate 12 seals the hole in the container. The device thereby seals off the interior of the container and preventing any undesired heat from seeping into the refrigerated interior.

After the disposable sheath is installed, the probe 82 of a data logger 84 (see FIG. 4A) is introduced into the aperture 48 of the mounting plate 12, through the central canal 46 of the linear projection 44 and the longitudinal bore 60 of the sheath 14, and into the distal end 64 of the latter. To function properly, the sheath 14 should extend into the container a sufficient distance to expose enough of its outer surface to the interior of the container so that heat exchange may take place reasonably quickly through the sheath's walls into the bore 60 for sensing by the probe 82. After extending the probe 82 into the bore 60 of the sheath 14, the data logger 84 is attached to the mounting plate from which position it can be read from outside the container at any time. The probe 82 is connected to the data logger 84 via a flexible wire 85. It will be understood by those skilled in the art that the connection could include a plurality of wires, such as in a strip cable, and that the probe 82 alternatively could be integrally joined to the data logger.

A data logger 84 according to the invention, shown in FIGS. 4A, 4B, 5, and 6, comprises two outward facing notches 86 leaving at the bottom of each notch a clockwise-extending flange 88. A forward portion 90 is sufficiently long and of sufficient radial depth to accommodate mounting jaw 18 when the data logger 84 is positioned over mounting plate 12. Pressing data logger 84 against the outer surface 16 of the mounting plate 12 presses the underside of flanges 88 against stop bosses 20 which moves stop bosses 20 from their rest position to the biased position. Subsequent rotation of the data logger in a clockwise direction delivers flanges 88 into mounting jaws 18 until stop bosses 20 are released to their rest position by popping up into cavities 92. Over-rotation of the flanges 88 is prevented by stop walls 26. The probe 82 and wire 85 shown in FIG. 4A have been eliminated from FIGS. 5 and 6 for the sake of clarity but would normally be connected with the data logger 84 through access hole 93.

Figure 4A:
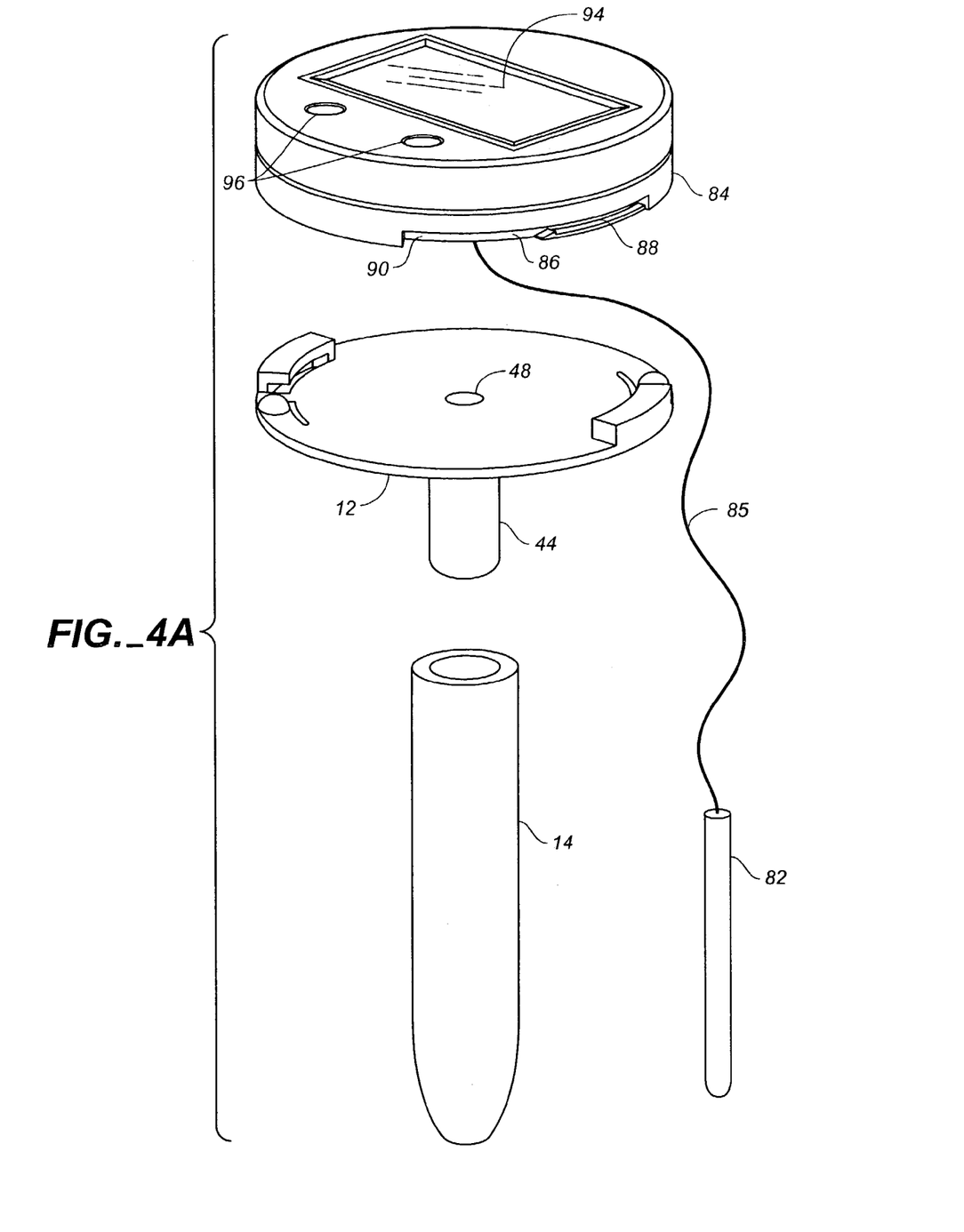
FIG. 4A is an exploded top perspective view of a disposable data logger sheath according to the invention showing a data logger and probe for attachment the mounting plate.
Figure 4B:
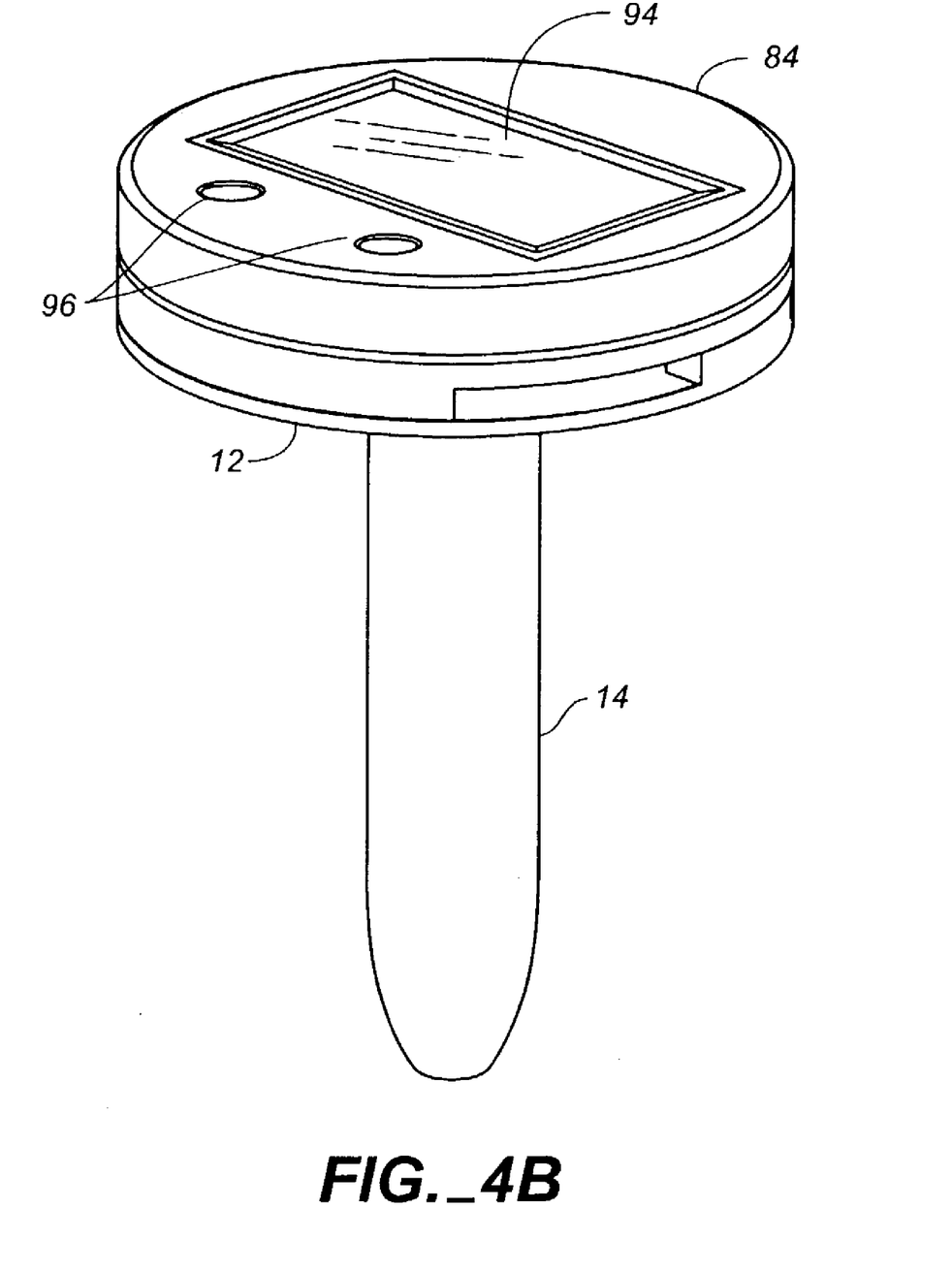
FIG. 4B is a top perspective view of the fully assembled disposable data logger sheath and data logger shown in FIG. 4A
Figure 5:
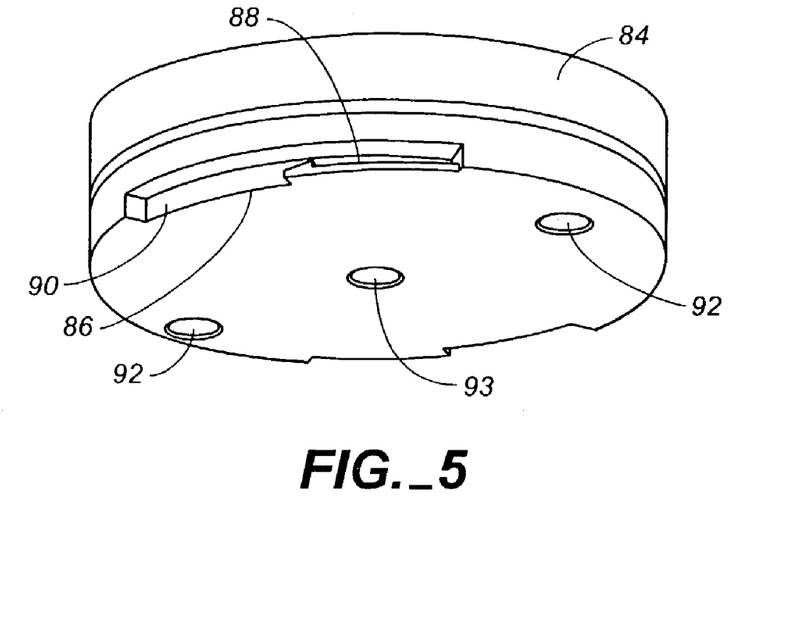
FIG. 5 is bottom perspective view of a data logger shown in FIG. 4A without the data logger probe according to the invention.
Figure 6:
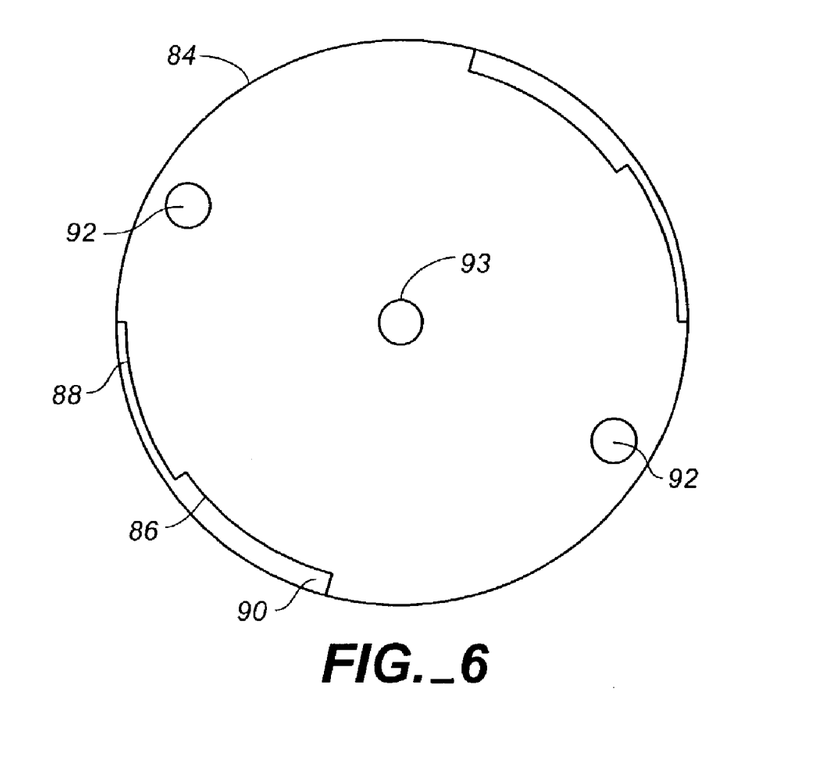
FIG. 6 is an bottom view of the data logger shown in FIG. 5.

Provided on the top or outer surface of the illustrated embodiment of a data logger 84 is a display screen 94 and two control buttons 96 as seen in FIGS. 4A and 4B. However, it will be understood that data loggers may be provided with a multitude of configurations including additional controls, multiple and different displays, and ports for communicating with associated devices.

Figure 7:
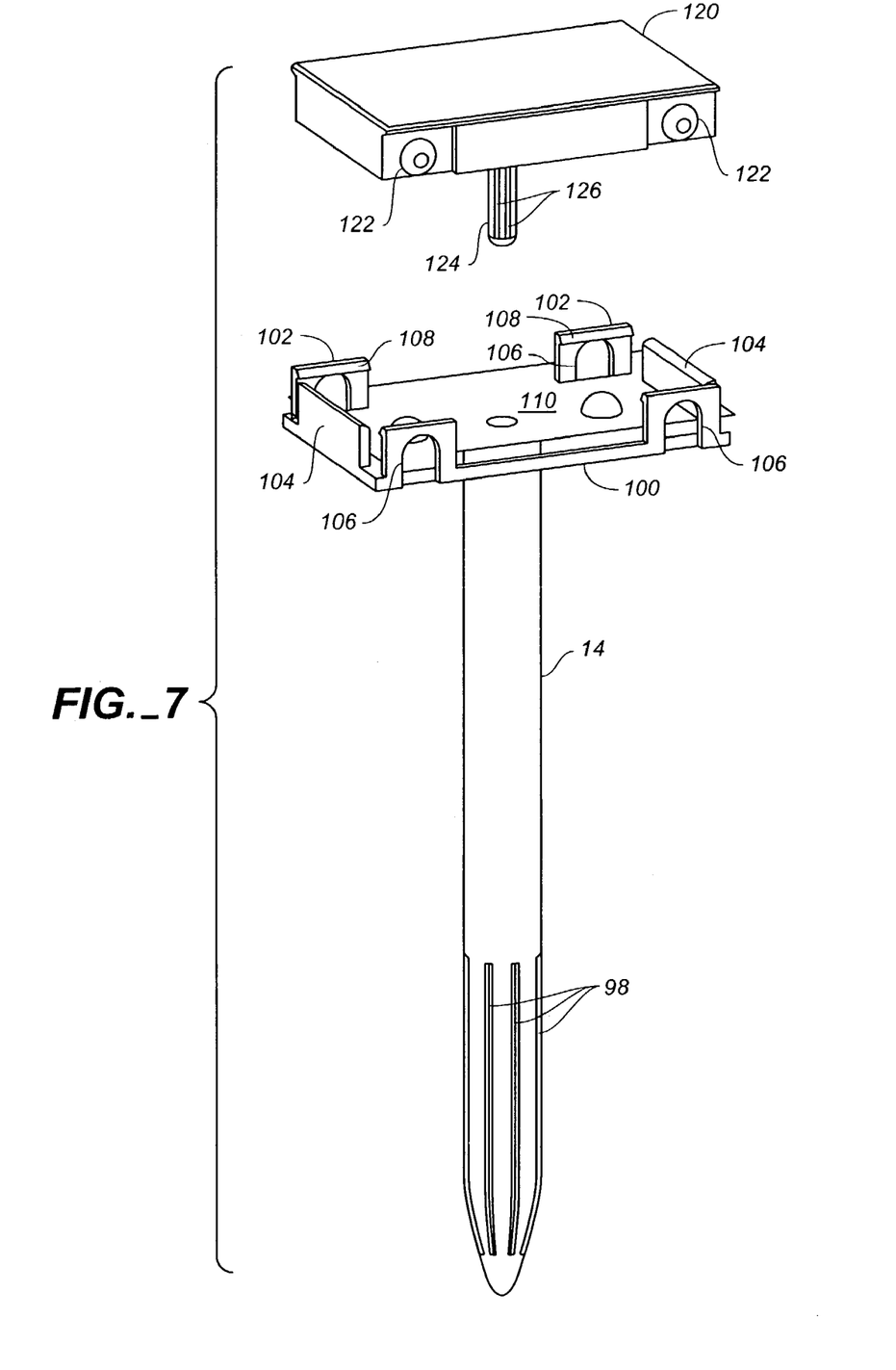
FIG. 7 is an exploded top perspective view of an alternate embodiment of a disposable data logger sheath according to the invention.
Figure 8:
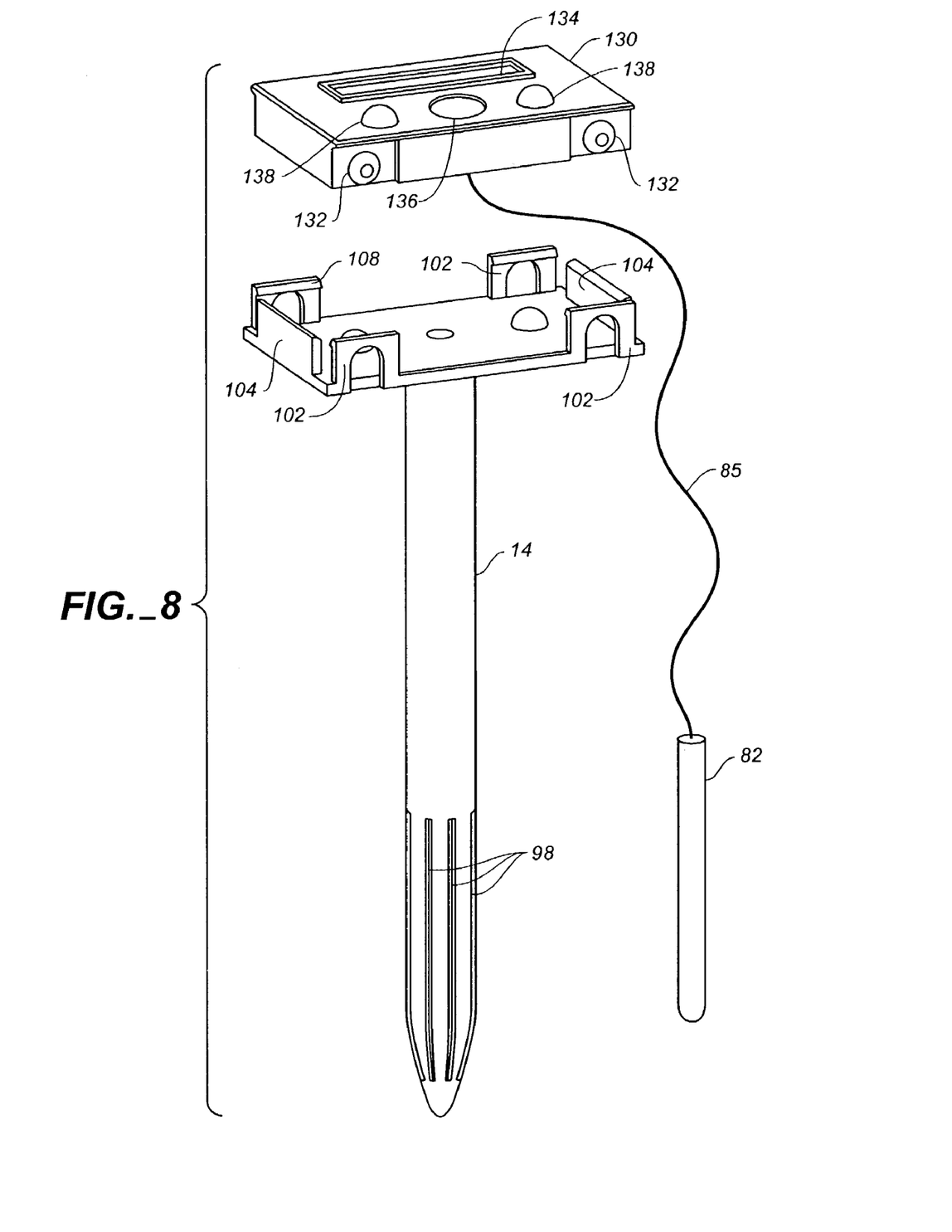
FIG. 8 is an exploded top perspective view of a disposable data logger sheath according to the invention showing a rectangular-shaped data logger having a detent mechanism and probe for attachment to the mounting plate and sheath shown in FIG. 7.

In a third embodiment of the invention shown in FIGS. 7 and 8, sheath 14 comprises a plurality of longitudinally extending fenestrations 98 exposing bore 60 more directly to the conditions of the interior of the container. Here again, this embodiment is appropriate when moisture may be of reduced concern and a faster heat exchange between the sheath bore and interior of the container is preferred.

Figure 9:
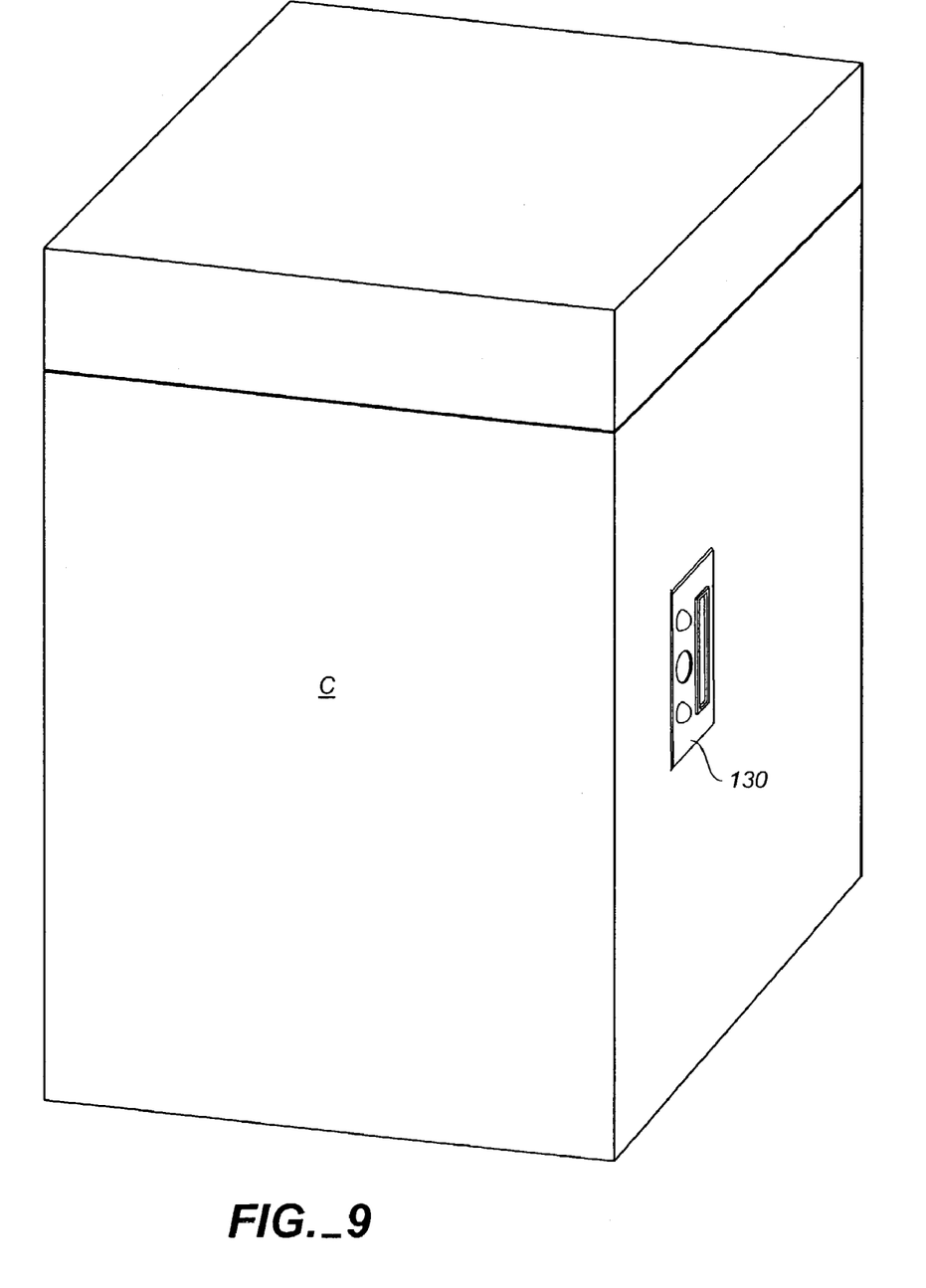
FIG. 9 is a perspective view of a conventional container showing a disposable data logger sheath installed in the side of the container.

Continuing to refer to FIGS. 7 and 8, an alternate embodiment of a mounting plate is shown at 100. Mounting plate 100 is rectangular in configuration, rather than the annular shape of mounting plate 12 shown in FIGS. 1 to 4B. Preferably, mounting plate 100 is mounted in a rectangular recess in the wall of a container C conforming to its lateral dimensions as shown in FIG. 9. Mounting plate 100 includes a plurality of pairs of opposed side clips 102 and a pair of opposed end walls 104 perpendicular to the side clips. Each mounting clip defines an arched interior opening 106. Side clips 102 are preferably constructed of resilient material, the flexibility of which is assisted by the reduction of material in the clip laterally co-extensive with interior opening 106. Clips 102 are sufficiently resilient that a data logger having dimensions slightly larger than the distance between opposing retention ridges 108 may be pressed therebetween onto the surface of the mounting plate 100. Retention ridges 108 are disposed above the top surface 110 of mounting plate 100 a distance just sufficient to extend above the mounted data logger for retaining the same in place. End walls 104 function to restrain the data logger against longitudinal travel along the mounting plate 100.

As seen in FIG. 7, an alternate embodiment of cover plate 120 is shown having a plurality of detent projections 122 for mating with arched openings 106. When cover plate 120 is pressed down over mounting plate 100, detent projections 122 flex side clips 102 outward until the detent projections 122 snap into openings 106, thereby retaining cover plate 120 in mounted relation to mounting plate 100. Post 124 includes a longitudinally knurled surface 126 allowing it to be press-fit into aperture 118.

Finally, FIG. 8 shows a data logger 130 having a plurality of nodules 132, similar to the detent projections 122 of sealing cap 120, disposed in mating relation with openings 106 in side clips 102 of mounting plate 100. As with cap 120 shown in FIG. 6, when the data logger 130 is pressed over and onto mounting plate 100, nodules 132 force mounting clips 102 to flex outward until the nodules snap into openings 106. The combination of nodules 132 and mounting clips 102 forms a secure detent mechanism for retaining the data logger in place on the outside of a container where it is immediately readable and easily retrieved. Similar to the round data logger 84 shown in FIGS. 4A, 4B, 5 and 6, data logger 130 includes a display 134 and control button 136, and infrared transceivers 138.

In the preferred embodiment of the invention, the entire device is manufactured of out of any rigid, light-weight material such as plastic, at very low cost and, after use, is completely disposable. Hence, the invention is ideally suited for dedicated use to a single container or a single shipment and may be disposed of at the end of the useful life of the container or at the terminus of the shipment.

There have thus been described and illustrated certain preferred embodiments of a disposable sheath for a data logger probe according to the invention. Although the present invention has been described and illustrated in detail, it is clearly understood that the same is by way of illustration and example only and is not to be taken by way of limitation, the spirit and scope of the present invention being limited only by the terms of the appended claims and their legal equivalents.

We claim:

1. A disposable sheath for use with a data logger of the type having an extendable probe, the sheath comprising:
   a mounting plate having an inner face, an outer face, and an aperture extending between said inner and outer faces,
   a linear projection extending from said inner face of said mounting plate, said linear projection having an outer diameter, a free end, and a central canal extending from said aperture of said mounting plate to said free end,
   an elongated sheath extending from said inner face of said mounting plate, said elongated sheath having a distal end,
   a longitudinal bore extending through said elongated sheath to said distal end thereof, said longitudinal bore having an enlarged proximal portion having a caliber approximating said outer diameter of said linear projection, and said linear projection removably inserted in said enlarged proximal portion of said longitudinal bore such that said central canal is in communication with said longitudinal bore of said sheath, and
   retention means for detachable retention of a data logger on said outer surface of said mounting plate with an extendable probe of the retained data logger disposed in said longitudinal bore, said retention means having a plurality of overlap members arranged annularly around said aperture.

2. A disposable sheath according to claim 1 further comprising:
   a cover plate having an inwardly extending peg, said peg having a diameter approximately equivalent to said central canal for removable insertion thereof into said canal.

3. A disposable sheath for use with a data logger of the type having an extendable probe, the sheath comprising:
   a mounting plate having an inner face, an outer face, and an aperture extending between said inner and outer faces,
   an elongated sheath extending from said inner face of said mounting plate, said elongated sheath having a distal end,
   a longitudinal bore extending through said elongated sheath to said distal end thereof and in communication with said aperture of said mounting plate, and
   plurality of outwardly facing recesses adjoining said outer face of said mounting plate and arranged annularly around said aperture, said plurality of recesses for mating alignment with a plurality of flanges on a data logger for detachable retention of the data logger on said outer surface of said mounting plate with the extendable probe of the retained data logger disposed in said longitudinal bore.

4. A disposable sheath according to claim 3 further comprising:
   a plurality of limit walls in perpendicular disposition relative to said outer face of said mounting plate, said limit walls adjoining said recesses for limiting rotational movement of a plurality of flanges on a data logger disposed in said recesses.

5. A disposable sheath for use with a data logger of the type having an extendable probe, the sheath comprising:
   a mounting plate having an inner face, an outer face, and an aperture extending between said inner and outer faces,
   an elongated sheath extending from said inner face of said mounting plate, said elongated sheath having a distal end,
   a longitudinal bore extending through said elongated sheath to said distal end thereof and in communication with said aperture of said mounting plate,
   plurality of overlap members generally parallel to, spaced from, and rigidly connected to said outer face of said mounting plate, said overlap members arranged annularly around said aperture, said overlap members for overlapping disposition with a plurality of outwardly extending flanges on a data logger for detachable retention of a data logger on said outer surface of said mounting plate with an extendable probe of the retained data logger disposed in said longitudinal bore, and
   a plurality of limit walls perpendicular to said outer face of said mounting plate for limiting rotational movement of said flanges.

6. A disposable sheath according to claim 5 further comprising:
   a data logger having a bottom surface, said bottom surface having a plurality of outward facing notches, said data logger further having a plurality of outwardly extending flanges in said notches adjacent said bottom surface, each of said plurality of notches for mating disposition with one of said plurality of overlap members, and each of said flanges for underlapping disposition with one of said plurality of overlap members for attachment of said data logger to said mounting plate.

7. A disposable sheath according to claim 6 further comprising:
   said mounting plate having a plurality of resilient fingers disposed adjacent said plurality of overlap members opposite said plurality of limit walls, each said finger having an upwardly extending stop boss, said stop boss having an apex, said fingers movable between a rest position, in which said fingers are in planar alignment with said mounting plate, and a biased position, in which said apexes of said stop bosses are in planar alignment with said outer surface of said mounting plate, and
   said bottom surface having a plurality of cavities for mating alignment with said stop bosses of said fingers of said mounting plate, such that said data logger is moveable from a first position, in which said bottom surface of said data logger is in contact with said upper surface of said mounting plate, said plurality of overlap members of said mounting plate are in mating alignment with said plurality of notches of said data logger, said flanges of said data logger are pressed against said stop bosses, and said stop bosses are in said biased position, to a second position, in which said plurality of overlap members of said mounting plate are in overlapping disposition with said flanges of said data logger, and said stop bosses are in mating disposition with said recesses in said bottom surface of said data logger, so that said data logger is detachably attached to said mounting plate in said second position.

8. A disposable sheath according to claim 5 further comprising:
   a linear projection extending from said inner face of said mounting plate, said linear projection having an outer diameter, a free end, and a central canal extending from said aperture of said mounting plate to said free end, and
   a cover plate having an inwardly extending peg, said peg having a diameter approximately equivalent to said central canal, said peg removably inserted through said aperture into said central canal.

9. A disposable sheath according to claim 8 further comprising:
   said mounting plate having a plurality of resilient fingers disposed adjacent said plurality of overlap members opposite said plurality of limit walls, each said finger having an upwardly extending stop boss, said stop boss having an apex, said fingers movable between a rest position, in which said fingers are in planar alignment with said mounting plate, and a biased position, in which said apexes of said stop bosses are in planar alignment with said outer surface of said mounting plate.

10. A disposable sheath for use with a data logger of the type having an extendable probe, the sheath comprising:
    a mounting plate having an inner face, an outer face, and an aperture extending between said inner and outer faces,
    an elongated sheath extending from said inner face of said mounting plate, said elongated sheath having a distal end,
    a longitudinal bore extending through said elongated sheath to said distal end thereof and in communication with said aperture of said mounting plate, and
    retention means for detachable retention of a data logger on said outer surface of said mounting plate with an extendable probe of the retained data logger disposed in said longitudinal bore,
    a linear projection extending from said inner face of said mounting plate, said linear projection having an outer diameter, a free end, and a central canal extending from said aperture of said mounting plate to said free end, and
    said longitudinal bore of said elongated sheath having an enlarged proximal portion having a caliber approximating said outer diameter of said linear projection, said linear projection removably inserted in said enlarged proximal portion of said longitudinal bore such that said central canal is in communication with said longitudinal bore of said sheath, and
    an extender having a near end, a far end, and an extender bore between said near end and said far end, said extender bore adjacent said near end having an enlarged extender bore portion having a diameter approximating said outer diameter of said linear projection, and said far end of said extender having a peripheral diameter approximating said caliber of said enlarged proximal portion of said longitudinal bore of said of said elongated sheath, wherein said linear projection is removably inserted in said enlarged extender bore portion of said extender, and said far end of said extender is removably inserted in said enlarged proximal portion of said longitudinal bore of said of said elongated sheath, such that said central canal of said linear projection is in communication with said longitudinal bore of said sheath via said extender bore.

11. A disposable sheath for use with a data logger of the type having an extendable probe, the sheath comprising:
    a mounting plate having an inner face, an outer face, and an aperture extending between said inner and outer faces,
    an elongated sheath extending from said inner face of said mounting plate, said elongated sheath having a distal end,
    a longitudinal bore extending through said elongated sheath to said distal end thereof and in communication with said aperture of said mounting plate, and
    a data logger having at least one pair of spaced apart outwardly facing detent projections, said mounting plate having at least one pair of spaced apart resilient side clips, each clip having an interior opening sized to receive one of said detent projections, said plurality of clips arranged for cooperating removable disposition of said detent projections in said openings of said side clips for detachable retention of said data logger on said outer surface of said mounting plate with the extendable probe of the retained data logger disposed in said longitudinal bore.

12. A disposable sheath according to claim 11 wherein:
    said data logger has at least two pairs of said detent projections.

13. A disposable sheath according to claim 11 wherein:
    each of said resilient side clips has an inwardly extending retention ridge for retaining in place a data logger mounted onto said mounting plate between said side clips.

14. A disposable sheath according to claim 11 further comprising:
    a pair of end walls in perpendicular disposition to said side clips, said end walls spaced apart at least sufficiently to receive therebetween a data logger.

15. A disposable sheath for use with a data logger of the type having an extendable probe, the sheath comprising:
    a mounting plate having an inner face, an outer face, and an aperture extending between said inner and outer faces,
    an elongated sheath extending from said inner face of said mounting plate, said elongated sheath having a distal end,
    a longitudinal bore extending through said elongated sheath to said distal end thereof and in communication with said aperture of said mounting plate, and
    a plurality of overlap members generally parallel to, spaced from, and rigidly connected to said outer face of said mounting plate, said overlap members arranged annularly around said aperture for overlapping disposition with a plurality of flanges on a data logger for detachable retention of the data logger on said outer surface of said mounting plate with an extendable probe of the data logger disposed in said longitudinal bore.

16. A disposable sheath for use with a data logger of the type having an extendable probe, the sheath comprising:
    a mounting plate having an inner face, an outer face, and an aperture between said inner and outer faces, a linear projection extending from said inner face of said mounting plate, said linear projection having a central canal, an elongated sheath having a distal end and a longitudinal bore extending through said elongated sheath to said distal end thereof, said elongated sheath removably attached to said linear projection such that said longitudinal bore of said sheath, said central canal of said linear projection, and said aperture of said mounting plate are in linear communication, and a plurality of overlap members generally parallel to, spaced from, and rigidly connected to said outer face of said mounting plate, said overlap members arranged annularly around said aperture for overlapping disposition with a plurality of flanges on a data logger for detachable retention of the data logger on said outer surface of said mounting plate with an extendable probe of the retained data logger disposed in said longitudinal bore.

17. A disposable sheath for use with a data logger of the type having an extendable probe, the sheath comprising:

a mounting plate having an inner face, an outer face, and an aperture extending between said inner and outer faces, an elongated sheath extending from said inner face of said mounting plate, said elongated sheath having a distal end, a longitudinal bore extending through said elongated sheath to said distal end thereof and in communication with said aperture of said mounting plate, a plurality of overlap members generally parallel to, spaced from, and rigidly connected to said outer face of said mounting plate, said overlap members arranged annularly around said aperture, a data logger having a plurality of outwardly extending flanges, said plurality of overlap members in overlapping disposition with said plurality of flanges, and a plurality of limit walls perpendicular to said outer face of said mounting plate, and a plurality of resiliently depressable stop bosses disposed adjacent said plurality of overlap members opposite to said plurality of limit walls, said flanges of said data logger releasably captured against rotation between said limit walls and said stop bosses.

18. A disposable sheath for use with a data logger of the type having an extendable probe, the sheath comprising:

a mounting plate having an inner face, an outer face, and an aperture extending between said inner and outer faces, an elongated sheath extending from said inner face of said mounting plate, said elongated sheath having a distal end, a longitudinal bore extending through said elongated sheath to said distal end thereof and in communication with said aperture of said mounting plate, a data logger having at least two pairs of spaced apart outwardly facing detent projections, and said mounting plate has at least two pairs of spaced apart resilient clips, each clip having an interior opening sized to receive one of said detent projections, said plurality of clips arranged for cooperating removable disposition of said detent projections in said openings of said clips for detachable retention of said data logger on said outer surface of said mounting plate with an extendable probe of the retained data logger disposed in said longitudinal bore.

19. A method for recording data comprising:

passing a distal end of an elongated sheath of a disposable sheath for use with a data logger through a container wall of a container into an interior space of the container, said elongated sheath extending inwardly from a mounting plate, positioning an inner face of said mounting plate against an outside surface of the container wall, passing an extendable probe of a data logger through an aperture in said mounting plate and into a longitudinal bore of said elongated sheath to said distal end thereof, removably attaching the data logger to an outer face of said mounting plate such that said data logger is mounted on the outside the container, and accessing data recorded on said data logger while said data logger remains mounted on said container.

20. The method of claim 19 further comprising:

selecting an elongated sheath of a desired length, attaching said elongated sheath to said mounting plate.

21. A method for recording data comprising:

inserting an extender between a mounting plate and an elongated sheath of a disposable sheath for use with a data logger extending inwardly from said mounting plate, passing a distal end of said elongated sheath through a container wall of a container into an interior space of the container, positioning an inner face of said mounting plate against an outside surface of the container wall, passing an extendable probe of a data logger through an aperture in said mounting plate and into a longitudinal bore of said elongated sheath to said distal end thereof, and removably attaching the data logger to an outer face of said mounting plate such that said data logger remains outside the container.

22. A method for recording data comprising:

passing a distal end of an elongated sheath of a disposable sheath for use with a data logger through a container wall of a container into an interior space of the container, said elongated sheath extending inwardly from a mounting plate, positioning an inner face of said mounting plate against an outside surface of the container wall, passing an extendable probe of a data logger through an aperture in said mounting plate and into a longitudinal bore of said elongated sheath to said distal end thereof, pressing an outwardly extending plurality of flanges on said data logger against said an outer face of said mounting plate, rotating said plurality of flanges into underlapping disposition with a plurality of overlap members on said mounting plate.

23. The method of claim 22 further comprising:

pressing said plurality of flanges against a plurality of resiliently depressable stop bosses on said mounting plate, said stop bosses in a rest position extending outwardly from said outer surface of said mounting plate, urging said stop bosses to a biased position in which a plurality of apexes of said stop bosses are brought into planar alignment with said outer surface of said mounting plate, and releasing said stop bosses from said biased position to said rest position upon rotating said plurality of flanges into underlapping disposition with said plurality of overlap members, thereby securing said flanges against reverse rotation in said underlapping disposition with said overlap members.

24. The method of claim 22 wherein:
limiting rotation of said plurality of flanges such that they are retained under said plurality of overlap members.

25. A method for recording data comprising:
passing a distal end of an elongated sheath of a disposable sheath for use with a data logger through a container wall of a container into an interior space of the container, said elongated sheath extending inwardly from a mounting plate,
positioning an inner face of said mounting plate against an outside surface of the container wall,
passing an extendable probe of a data logger through an aperture in said mounting plate and into a longitudinal bore of said elongated sheath to said distal end thereof,
removably attaching the data logger to an outer face of said mounting plate such that said data logger remains outside the container, and
urging at least one pair of spaced apart resilient clips on said mounting plate over at least one pair of spaced apart outwardly facing detent projections on said data logger until each of said detent projections snaps into an interior opening in one of said clips.

26. A disposable sheath for use with a data logger of the type having an extendable probe, the sheath comprising:
a mounting plate having an inner face, an outer face, and an aperture extending between said inner and outer faces,
an elongated sheath extending from said inner face of said mounting plate, said elongated sheath having a distal end,
a longitudinal bore extending through said elongated sheath to said distal end thereof and in communication with said aperture of said mounting plate, and
retention means for detachable retention of a data logger on said outer surface of said mounting plate with an extendable probe of the retained data logger disposed in said longitudinal bore said retention means having a plurality of overlap members arranged annularly around said aperture,
a linear projection extending from said inner face of said mounting plate, said linear projection having an outer diameter, a free end, and a central canal extending from said aperture of said mounting plate to said free end,
said longitudinal bore of said elongated sheath having an enlarged proximal portion having a caliber approximating said outer diameter of said linear projection, said linear projection is removably insertable in said enlarged proximal portion of said longitudinal bore for communication of said central canal with said longitudinal bore of said sheath, and
a cover plate having an inwardly extending peg, said peg having a diameter approximately equivalent to said central canal for removable retention thereof in said canal, said cover plate further having a lower surface, said lower surface having a plurality of recesses dimensioned for receiving said retention means.

27. A disposable sheath for use with a data logger of the type having an extendable probe, the sheath comprising:
a mounting plate having an inner face, an outer face, and an aperture extending between said inner and outer faces,
an elongated sheath extending from said inner face of said mounting plate, said elongated sheath having a distal end,
a longitudinal bore extending through said elongated sheath to said distal end thereof and in communication with said aperture of said mounting plate, and
retention means for detachable retention of a data logger on said outer surface of said mounting plate with an extendable probe of the retained data logger disposed in said longitudinal bore said retention means having a plurality of overlap members arranged annularly around said aperture, and
a cover plate having an inwardly extending peg, said peg having a diameter approximately equivalent to said longitudinal bore for removable retention thereof in said canal bore, said cover plate further having a tower surface, said lower surface having a plurality of recesses dimensioned for receiving said retention means.

* * * * *

UNITED STATES PATENT AND TRADEMARK OFFICE
CERTIFICATE OF CORRECTION

PATENT NO. : 7,004,623 B2 Page 1 of 1
DATED : February 28, 2006
INVENTOR(S) : Jon Nakagawa and Gregory T. Reel It is certified that error appears in the above-identified patent and that said Letters Patent is hereby corrected as shown below:

Column 2,
Line 47, delete "he".

Column 5,
Line 5, "th" should read -- the --.
Line 26, delete "to" between "preparing" and "the".
Line 41, change "preventing" to read -- prevents --.

Column 7,
Line 5, delete "of" between "manufactured" and "out".

Column 9,
Line 66, delete "of said" between "said" and "elongated".

Column 10,
Line 3, delete "of said" between "bore" and "of".

Column 13,
Line 39, change "tower" to read -- lower --.

Signed and Sealed this

Ninth Day of May, 2006

JON W. DUDAS
*Director of the United States Patent and Trademark Office*